Figure 1:
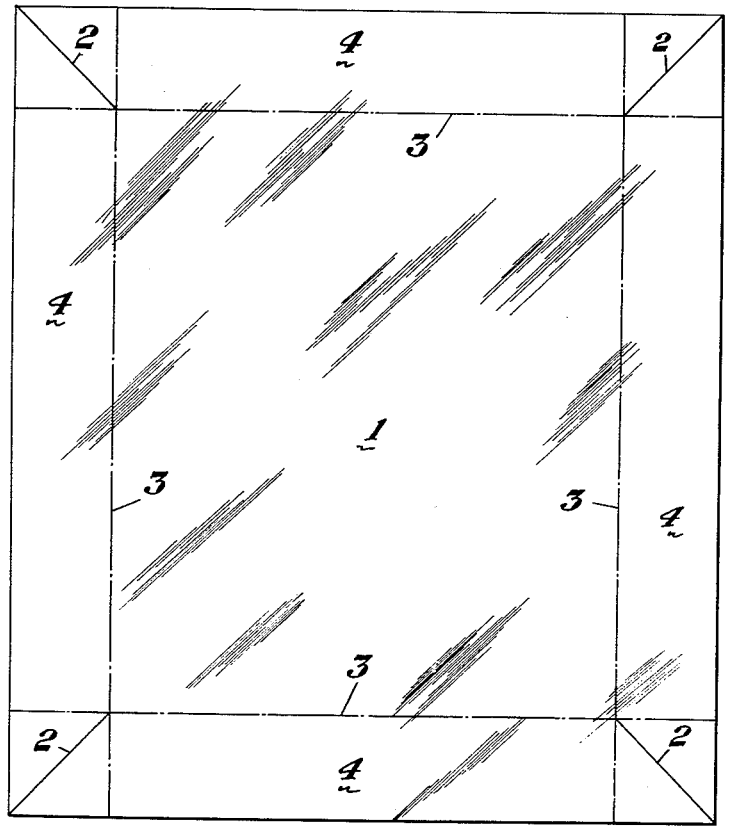

Nov. 22, 1960

A. NOBILI 2,961,139

CORRUGATED CARDBOARD PACKAGE FOR
GARDEN AND FRUIT PRODUCTS

Filed Aug. 26, 1957

6 Sheets-Sheet 1

ARDUINO NOBILI
INVENTOR.

BY Wendeworth, Lind & Ponack
Attys

Nov. 22, 1960
A. NOBILI
2,961,139
CORRUGATED CARDBOARD PACKAGE FOR
GARDEN AND FRUIT PRODUCTS
Filed Aug. 26, 1957
6 Sheets-Sheet 2
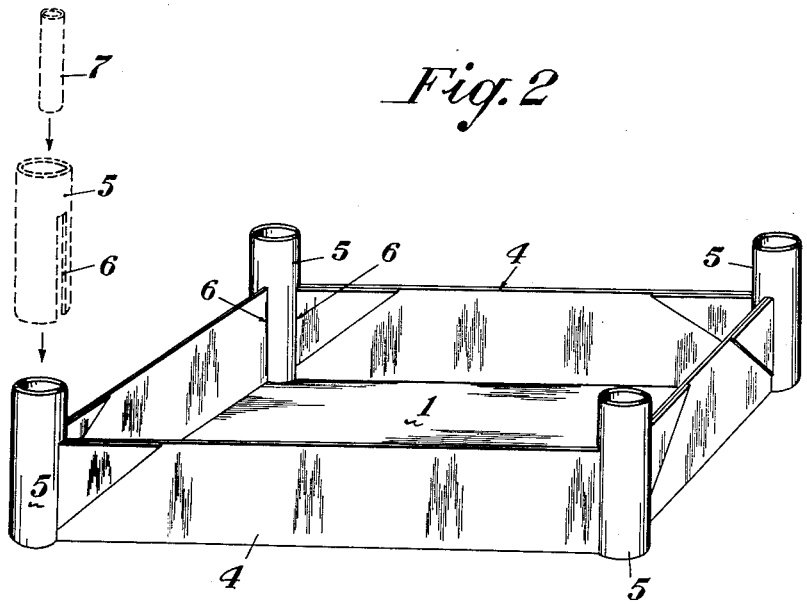
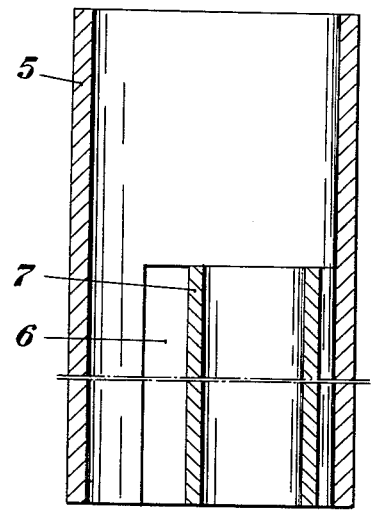
ARDUINO NOBILI
INVENTOR.
BY Wenderoth, Lind & Ponack
Attys Nov. 22, 1960

A. NOBILI 2,961,139

CORRUGATED CARDBOARD PACKAGE FOR
GARDEN AND FRUIT PRODUCTS

Filed Aug. 26, 1957

6 Sheets-Sheet 3

ARDUINO NOBILI
INVENTOR.

BY
Wenderoth, Lind & Ponack
Attys

ARDUINO NOBILI
INVENTOR.

Nov. 22, 1960  A. NOBILI  2,961,139
CORRUGATED CARDBOARD PACKAGE FOR
GARDEN AND FRUIT PRODUCTS

Filed Aug. 26, 1957  6 Sheets-Sheet 5

ARDUINO NOBILI
INVENTOR.

BY Wenderoth, Lind & Ponack
Attys

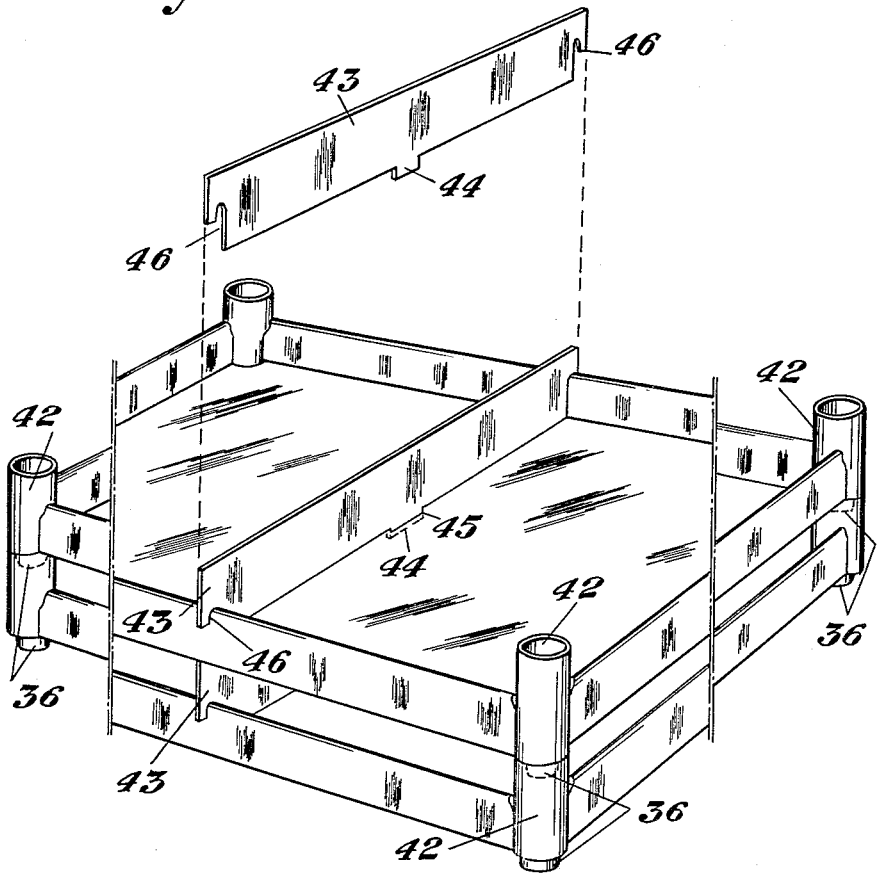

United States Patent Office 2,961,139
Patented Nov. 22, 1960

2,961,139

CORRUGATED CARDBOARD PACKAGE FOR GARDEN AND FRUIT PRODUCTS

Arduino Nobili, Rieti, Italy, assignor to Nobili a.r.l., Rome, Italy, a company of Italy Filed Aug. 26, 1957, Ser. No. 680,318

Claims priority, application Italy Sept. 10, 1956

5 Claims. (Cl. 229—6)

The present invention relates to the packages and more particularly it relates to a package made of corrugated cardboard, for garden and fruit products.

The purpose of this invention is that of embodying a package of the concerned type made of cardboard having the advantage with respect to the existing ones, made of wooden material, of being apt to be quickly assembled at the time of its use, affording thus a remarkable space saving when the empty package is to be shipped, as well as a remarkable decrease of the tare due to its very reduced weight.

The package according to this invention can be assembled by the use of no tool, and is of the so called disposable type, i.e. owing to its very reduced cost it may be used a single time to the advantage of its hygienic conditions.

According to this invention a plate is provided made of corrugated cardboard, having a rectangular shape and cut at its four corners with cuts extending to a certain length along the diagonals, bending lines connecting the inner ends of said cuts, so as to define in the cardboard rectangle a peripheral band which is upturned along said bending lines to form the walls of the package, said walls being fastened and strengthened in register with the corners by means of cylindrical members made of cardboard and provided with slots wherein the aforesaid parts are fit.

According to another form of embodiment of this invention, a base element is provided which is formed by a rectangular member made of corrugated cardboard and diagonally cut at its corners, with bends parallel to the sides and tangent to the inner ends of said cuts and provided with pairs of notches symmetrically arranged on the edges of the base element with respect to said cuts, a stiffening cylindrical element with slots for the package walls and means to allow said packing to be blocked when stacked.

According to a further form of embodiment, the package is provided with a rectangular base element with bends parallel to its edges defining the walls of said package, and with diagonal notches wherein a cylindrical rest element is fit, holes intersecting at right angles the outer bends and generating pairs of joints adjacent each corner of the base element, a cylindrical stiffening element inserted into said joints and arranged concentrically to said cylindrical rest element, a partition cross-wise arranged on the base element and having a height substantially equalling that of said cylindrical stiffening element.

This invention will be described with reference to the attached drawings showing by way of example and with no limitation of the scope of this invention, some preferred forms of embodiment of the same invention.

Figure 3:
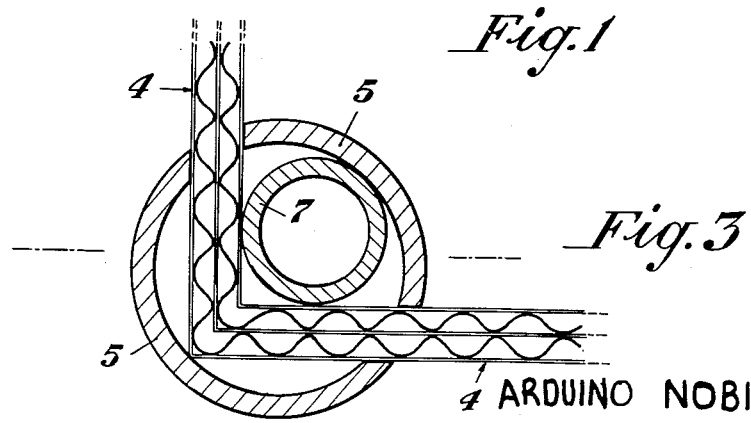
Figure 5:
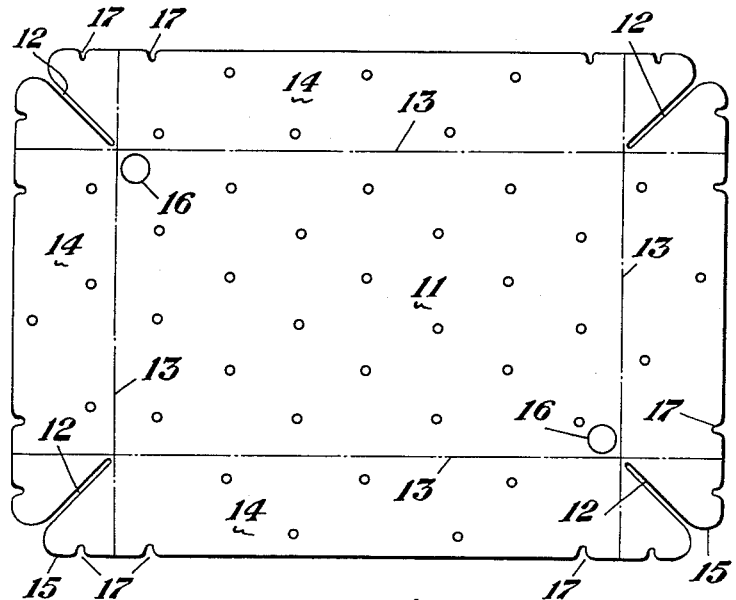
Figure 6:
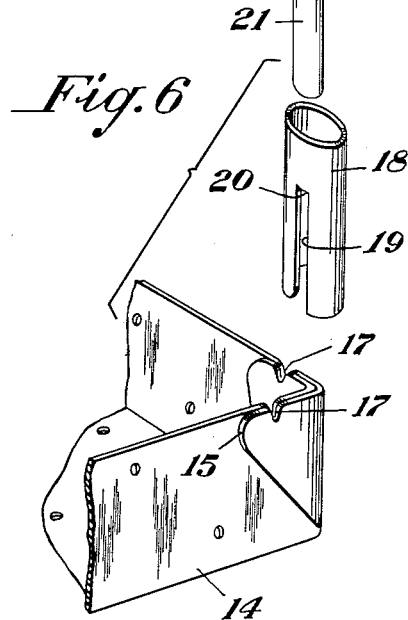
Figure 7:
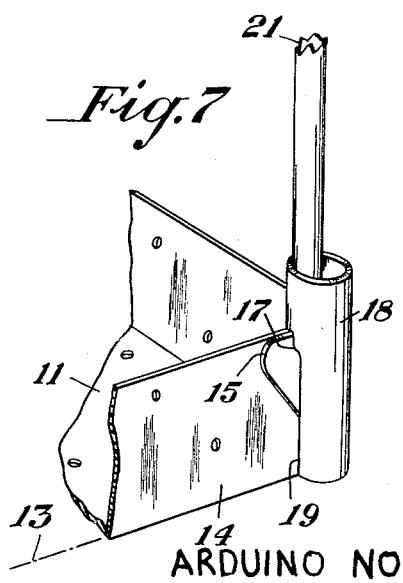
Figure 9:
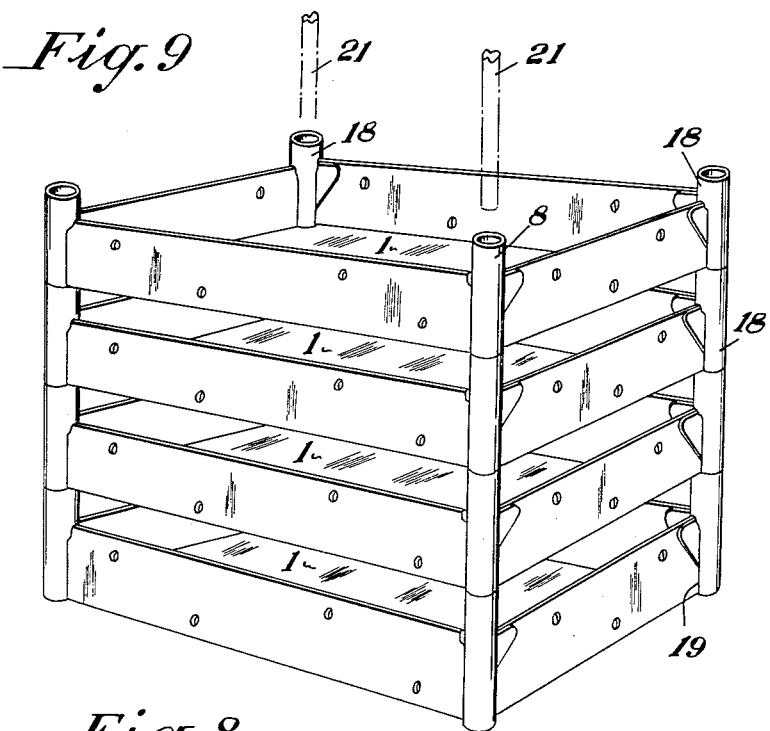
Figure 8:
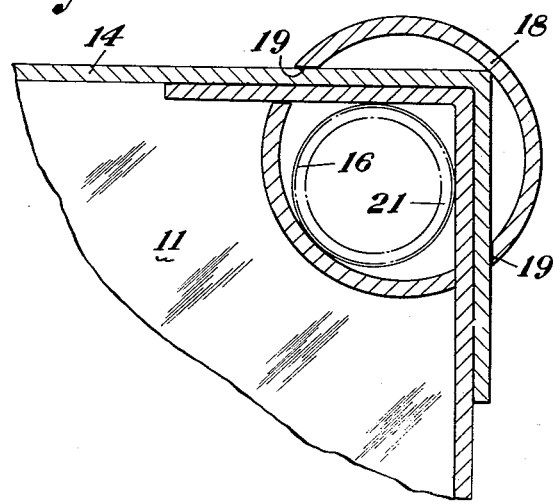

In the drawings:

Fig. 1 shows a plane view of the base element;
Fig. 2 shows a view of the assembled package;
Fig. 3 shows a plane view of one of the corners;
Fig. 4 is a longitudinal sectional view of one of the fastening members for the corner;

Fig. 5 shows the base element of another form of embodiment of this invention;
Fig. 6 is a detail exploded perspective view of one of the corners of the package;
Fig. 7 shows a perspective view of one of the corners of the assembled package;
Fig. 8 is a horizontal sectional view of a corner;
Fig. 9 shows a stack comprised of packages embodied according to Figs. 5 to 8;
Figs. 10 to 13 are perspective detail views showing the various manufacturing steps of a further form of embodiment of the package according to this invention, and
Fig. 14 is a perspective view of two packages according to Figs. 10 to 13 in their stacked position.

With reference to Figs. 1 and 2, the package according to this invention is comprised of a base element 1, prefferably rectangle shaped and made of corrugated cardboard; said element is provided with the diagonal cuts 2 and with the bends 3.

When the limbs 4 defined by said bends are upward turned and arranged as shown in the figures, a parallelepiped receptacle is obtained, whose walls have an height equalling the width of the zones defined by the bends 3.

In order to fasten the corners (see the Figs. 3 and 4) the cylindrical elements 5 made of strong cardboard are provided, with the longitudinal slots 6 whereinto fit the walls leading to each corner. The length of the slots 6 is related to the height of the receptacle walls, and in the bay comprised between the corner and the element 5, a second cardboard cylinder 7 is inserted, having the purpose of reinforcing the strength of the unit. A triangular prism may be substituted for the cylinder 7.

The unit is very quickly assembled, the only thing to be made being lifting the limbs of the base element, and fitting the cylindrical elements on the corners.

A strong and very light weight package is thus obtained which may be stacked. Any advertising may be printed on the package walls.

Figs. 5 to 9 show a second form of embodiment of the package.

With reference to Figs. 5 and 6, the rectangle shaped base element 11, is provided with the diagonal cuts 12 and the bends 13 defining the package walls 14, following the bending of the rounded corners 15 as seen in Fig. 6. The diagonally aligned apertures 16 through two inner corners of the bends 13, have a function which will be set out hereinafter.

Symmetrically to each corner the notches 17 are provided so spaced apart that when the lateral limbs of the base element are bent as in Fig. 6, the corresponding pairs of notches are in register.

In order to fasten the corner, the cylindrical element 18 is provided carrying the slots 19 wherein the walls 14 are received while the upper part 20 of the slot is received within the notches 17. Thus a strong structure is obtained in that the corner is blocked as shown at Fig. 7.

The inner holes 16 (see also Figs. 7 and 8) when the package has been assembled, are inside the sleeve 18 and serve for the insertion of tubes 21 blocking the packages when stacked (see Fig. 9).

Vent holes may be provided on the surface of the package for aeration purposes, and the inside thereof may be rendered water-proof in one of the well known methods.

A further form of embodiment of the package according to this invention is shown at Figs. 10 to 14.

With reference to Figs. 10 to 13, the base element 31, obtained from a rectangular sheet of corrugated cardboard, is provided with the bends 32 and 33 parallel to one another and to the edge 34.

Each corner of the base element 31 has a diagonal slot 35 whereinto a rest cylinder 36 is fit, carrying the slots 37.

Figure 10:
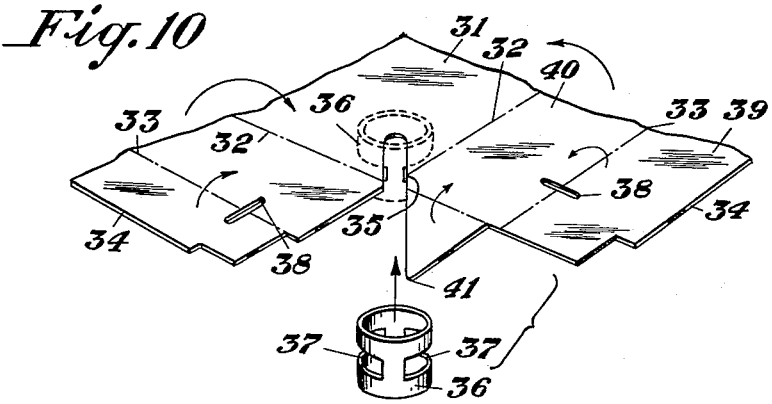
Figure 11:
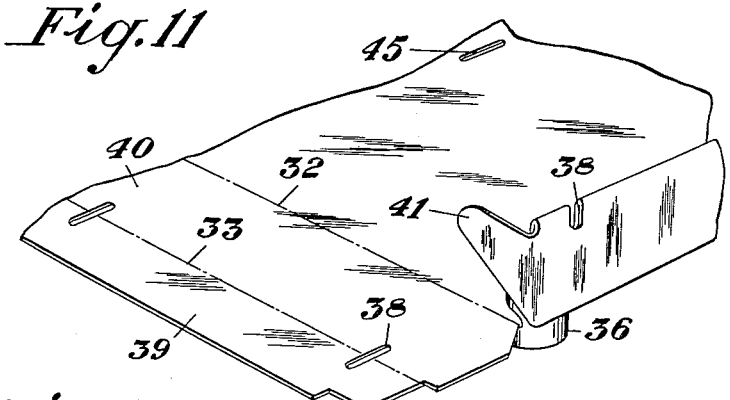

The depth of the diagonal slot 35 is such to allow the cylinder 36 of gliding to the position shown in dotted line at Fig. 10, where the cylinder 36 is nearly tangent to the corner defined by the bends 32.

The apertures 38 are arranged at right angles to the bends 33, and said apertures are symmetrical with respect to said bends.

Figure 12:
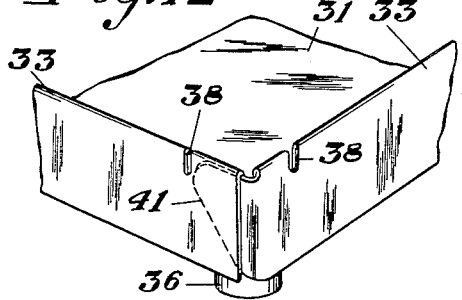
Figure 13:
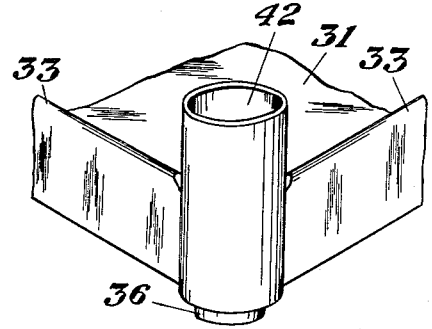

For forming the walls, the limb 39 is inwards bent along the bend 33 until overlapping the limb 40 and then the unit is bent again according to the bend 32, obtaining thus a double layer wall, (see Fig. 11), which is connected to the adjacent one by the insertion of the element 41 (see Fig. 12). The apertures 38, due to the folding operation originate two joints symmetrical with respect to the corner, whereinto two similar longitudinal elements are inserted, carried by a fastening cylindrical element 42 which is arranged concentrically to the rest cylinder 36.

Thus the package as shown at Fig. 14 may be obtained and said package may be stacked by inserting the rest cylinders 36 into the cylindrical elements 42.

To reinforce the longitudinal walls and to subdivide the inner recess, a partition 43 can be provided with a tooth 44, to be inserted into the aperture 45 provided on the plate and with two indentations 46 wherein said longitudinal walls are inserted.

As shown at Fig. 14, when the packages are stacked, the partitions 43 are vertically registering, originating thus an improved load distribution. The walls of the package have an height somewhat lesser than that of the cylinders 42; however by having the walls of a greater height, said walls can be formed by a single layer, as in the embodiment shown at Figs. 1 to 4.

I claim:

1. A container for fruit and other horticultural products which comprises a rectangular plate of corrugated cardboard having at its four corners equal cuts extending into said plate for equal distances, said cardboard plate having bending lines extending parallel to the edges of said plate and connecting the inner ends of the said cuts and defining within them a bottom for the container and between them and the edges of said plate at least a peripheral band along each side of the cardboard plate, said peripheral band being folded perpendicularly to said bottom along said bending line to form the walls of the container, the outer edges of the said wall forming band having notches therein symmetrically spaced from the corners of the said container, and a plurality of fastening means, one at each corner of the container, each of the said fastening means being a hollow cylinder of rigid material having two longitudinal slots therein having a length substantially equal to the width of the wall forming peripheral band, said longitudinal slots lying in axial planes intersecting at right angles, the walls at each corner passing through said slots, portions of said cylinder at the inner ends of said slots being engaged in said notches in the outer edge of the said peripheral band.

2. A container for fruit and other horticultural products which comprises a rectangular plate of corrugated cardboard having at its four corners equal cuts extending into said plate for equal distances along the diagonals of the said cardboard plate, said cardboard plate having bending lines extending parallel to the edges of said plate and connecting the inner ends of the said cuts and defining within them a bottom for the container and between them and the edges of said plate at least a peripheral band along each side of the cardboard plate, said peripheral band being folded perpendicularly to said bottom along said bending line to form the walls of the container, said bending lines extending to the edges of said plate and delimitating at the end of each of the said peripheral bands a triangular portion having the outer apex rounded, the outer edge of the said triangular portion and the outer edge of the said peripheral band having notches therein symmetrically located with respect to the bending line between them, the notch in a triangular portion registering during the formation of the wall of the container with the notch made on the edge of the adjoining band, and a plurality of fastening means, one at each corner of the container, each of the said fastening means being a hollow cylinder of rigid material having two longitudinal slots therein having a length substantially equal to the width of the wall forming peripheral band, said longitudinal slots lying in axial planes intersecting at right angles, the walls at each corner passing through said slots, portions of said cylinder at the inner ends of said slots being engaged in said notches in the outer edge of the said peripheral band and in the end triangular portion of the said peripheral band, said cardboard plate having two holes in the bottom at two diagonally opposed corners thereof which holes register with the said fastening members, and additional fastening elements inserted in the said cylindrical fastening members and the said holes of the bottom for locking to each other a plurality of containers which are in stacked relationship.

3. A container for fruit and other horticultural products which comprises a rectangular plate of corrugated cardboard having at its four corners equal cuts extending into said plate equal distances along the diagonals of the cardboard plate, said cardboard plate having two bending lines along each side parallel to the edge of the plate and spaced from each other, the inner bending lines delimiting within them a bottom for the container, and said bending lines delimiting between each other and the outer edge of said plate two peripheral bands bent up and forming a double wall for the container, said plate having apertures therein on the outer bending line extending perpendicular to the bending line and symmetrical with respect to the two parallel bands, said apertures forming pairs of notches adjacent to each corner of the container and symmetrical with respect thereto when the two peripheral bands are upturned to form the double wall of the container, a plurality of fastening members one for each of the corners of the container, each of the said fastening members being in the form of a hollow cylinder of rigid material and having two slots therein with a length substantially equal to the height of the double wall of the container, said longitudinal slots lying in axial planes intersecting at right angles, and the walls at each corner extending through said slots, portions of said cylinder at the inner ends of said slots engaging said notches formed by said apertures.

4. A container as claimed in claim 3 wherein said peripheral bands terminate even with the inner bending line defining the adjacent peripheral bands and one of the inner peripheral bands at each corner has a triangular tab thereon, said triangular tab being laterally bent and inserted between the walls of the adjacent double wall, and the diagonal slots extend into the bottom, and a further cylindrical supporting element at each corner and positioned in the said extended diagonal slot and having two lateral slots engaging the bottom at the corner, said supporting element being within the said cylindrical fastening member.

5. A container for fruit and other horticultural products which comprises a rectangular plate of corrugated cardboard having at its four corners equal cuts extending into said plate for equal distances along the diagonals of the said cardboard plate, said cardboard plate having bending lines extending parallel to the edges of said plate and connecting the inner ends of the said cuts and defining within them a bottom for the container and between them and the edges of said plate at least a peripheral band along each side of the cardboard plate, said peripheral band being folded perpendicularly to said bottom along said bending line to form the walls of the container, the outer edges of the said wall forming band having notches therein symmetrically spaced from the corners of the said container, and a plurality of fastening means, one at each corner of the container, each of the said fastening means being a hollow cylinder of rigid material having two longitudinal slots therein having a length substantially equal to the width of the wall forming peripheral band, said longitudinal slots lying in axial planes intersecting at right angles, the walls at each corner passing through said slots, portions of said cylinder at the inner ends of said slots being engaged in said notches in the outer edge of the said peripheral band, and a partition connecting two longitudinal walls of the container, said partition having a tooth on its lower edge and having a notch at each end for engaging the longitudinal walls of the container, the bottom of the container having an aperture therein receiving the tooth of the said partition, said partition having a height substantially equal to the height of the said fastening member.

References Cited in the file of this patent

UNITED STATES PATENTS

| | | |
|---|---|---|
| 1,048,031 | Bradley | Dec. 24, 1912 |
| 1,563,907 | Koff | Dec. 1, 1925 |

FOREIGN PATENTS

| | | |
|---|---|---|
| 33,008 | Netherlands | June 15, 1934 |
| 53,167 | Netherlands | Apr. 15, 1942 |
| 721,103 | Great Britain | Dec. 29, 1954 |